(12) United States Patent
Wahl et al.

(10) Patent No.: US 10,443,681 B2
(45) Date of Patent: Oct. 15, 2019

(54) CENTRIFUGAL PENDULUM

(71) Applicant: Schaeffler Technologies AG & Co. KG, Herzogenaurach (DE)

(72) Inventors: Peter Wahl, Woerth-Maximiliansau (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 280 days.

(21) Appl. No.: 15/300,381

(22) PCT Filed: Mar. 19, 2015

(86) PCT No.: PCT/DE2015/200179
§ 371 (c)(1),
(2) Date: Sep. 29, 2016

(87) PCT Pub. No.: WO2015/149792
PCT Pub. Date: Oct. 8, 2015

(65) Prior Publication Data
US 2017/0138437 A1    May 18, 2017

(30) Foreign Application Priority Data

Apr. 1, 2014  (DE) .................. 10 2014 206 102

(51) Int. Cl.
*F16F 15/14* (2006.01)

(52) U.S. Cl.
CPC ........ *F16F 15/145* (2013.01); *F16F 2222/08* (2013.01); *F16F 2232/02* (2013.01)

(58) Field of Classification Search
CPC ...... F16F 15/145; F16F 15/1407; F16F 15/15; F16F 15/223; F16F 15/283; F16F 15/31; F16F 15/30; F16F 15/13128; F16F 15/13107; F16F 15/131; F16F 15/26; F16F 15/12; F16H 2045/0263; Y10T 74/2128; Y10T 74/2131; Y10T 74/2121; Y10T 74/2184
See application file for complete search history.

(56) References Cited

U.S. PATENT DOCUMENTS

| 2,343,421 A | * | 3/1944 | Porter ................ F16F 15/14 |
| | | | 74/574.3 |
| 9,631,696 B2 | * | 4/2017 | Kuhnle ................ F16F 15/145 |

FOREIGN PATENT DOCUMENTS

| DE | 102012219959 A1 | 5/2013 |
| DE | 102013220534 A1 | 4/2015 |

(Continued)

OTHER PUBLICATIONS

EPO Translation of WO 2014/005907 A1, Hoffmann et al., Jan. 9, 2014 (Year: 2019).*

*Primary Examiner* — Daniel D Yabut

(57) ABSTRACT

A centrifugal pendulum which is mountable rotatably around an axis of rotation, having a pendulum flange, a first pendulum mass and a second pendulum mass, where the first pendulum mass is coupled with the pendulum flange by means of a slotted guide, where the slotted guide is designed to guide the first pendulum mass along a first oscillation path in a first oscillating motion, where the second pendulum mass is coupled with the first pendulum mass by a coupling means where the coupling means is designed to guide the second pendulum mass along a second oscillation path in a second oscillating motion.

15 Claims, 5 Drawing Sheets

(56) References Cited

FOREIGN PATENT DOCUMENTS

| | | | |
|---|---|---|---|
| EP | 2833018 A1 | 2/2015 | |
| JP | WO 2014021458 A1 | 2/2014 | |
| WO | WO 2012175213 A1 | 12/2012 | |
| WO | WO-2014005907 A1 * | 1/2014 | ............ F16F 15/145 |

* cited by examiner

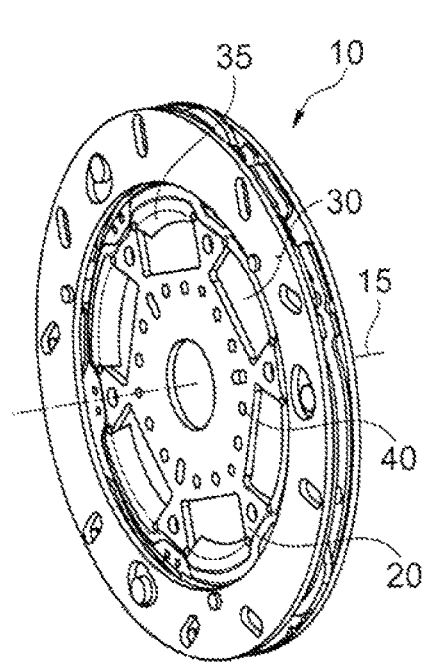
Fig. 1
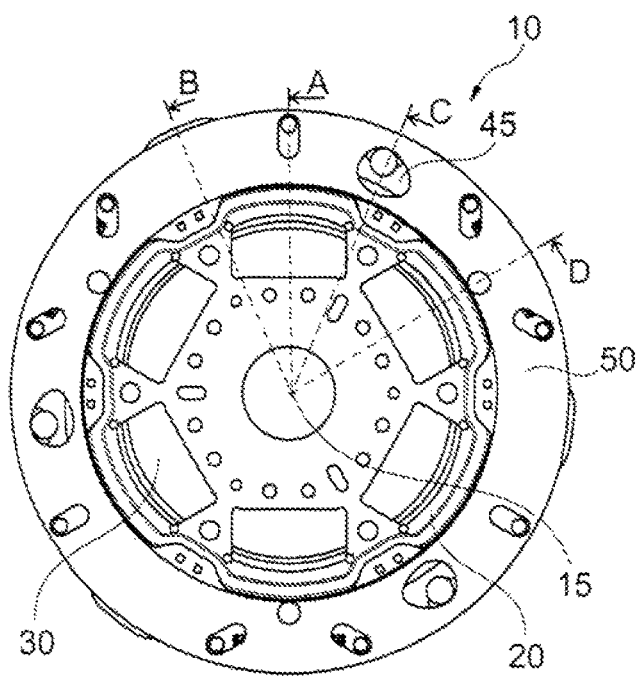
Fig. 2
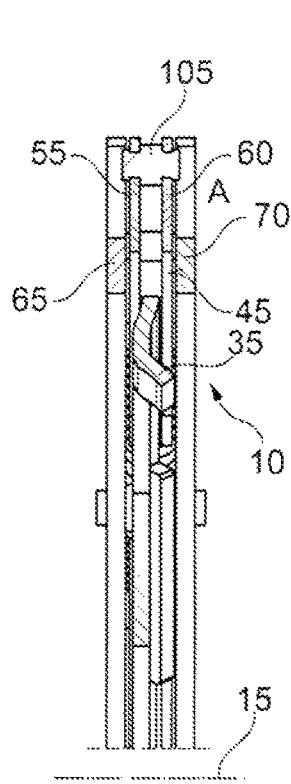
Fig. 3
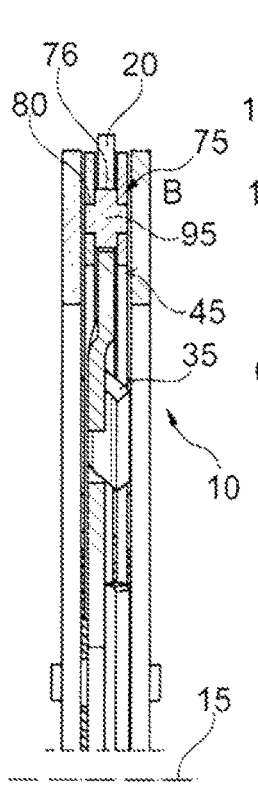
Fig. 4
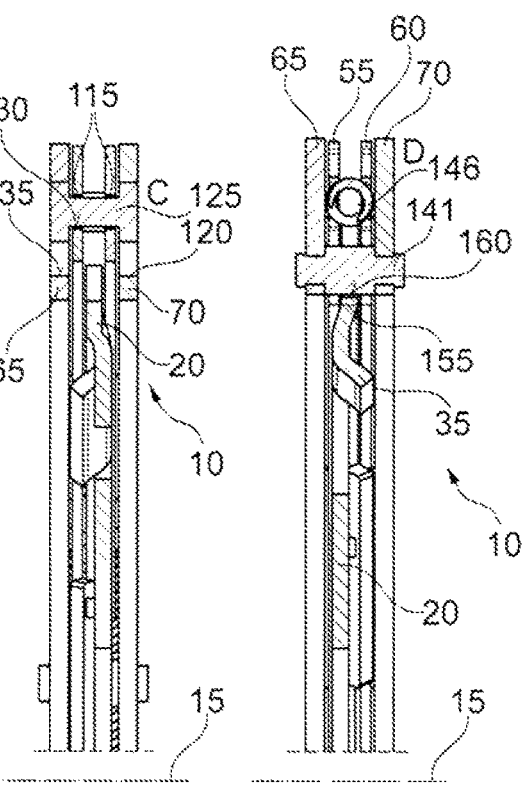
Fig. 5
Fig. 6

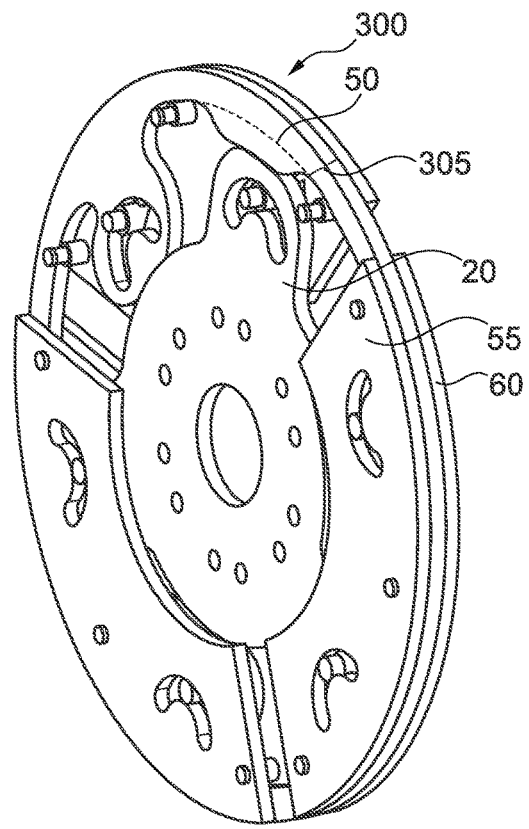 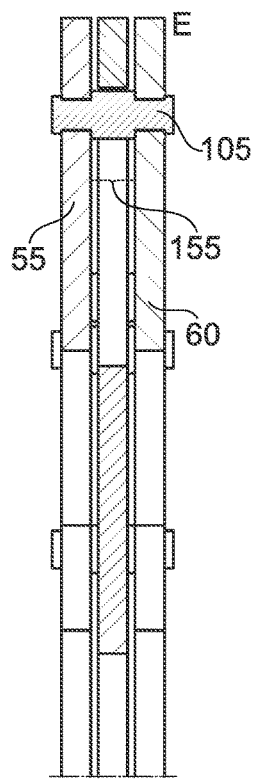 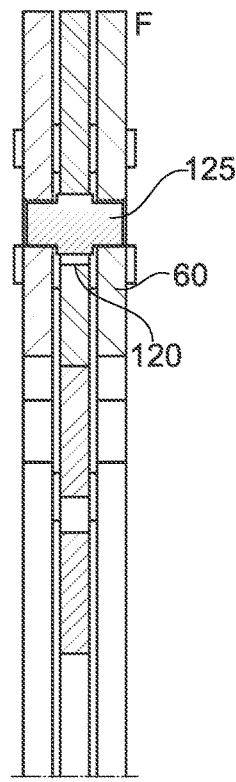
Fig. 11　　　　Fig. 13　Fig. 14
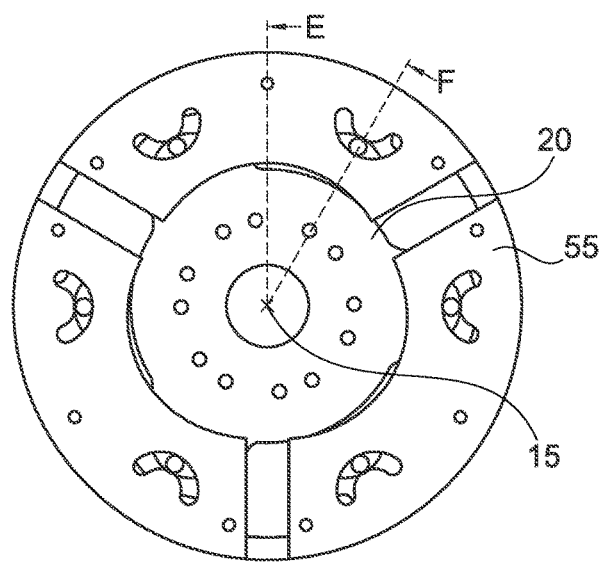
Fig. 12

CENTRIFUGAL PENDULUM

CROSS-REFERENCE TO RELATED APPLICATION

The present application is the U.S. national stage application pursuant to 35 U.S.C. § 371 of International Application No. PCT/DE2015/200179, filed Mar. 19, 2015, which application claims priority from German Patent Application Nos. DE 10 2014 206 102.4, filed Apr. 1, 2014, which applications are incorporated herein by reference in their entireties.

TECHNICAL FIELD

The present disclosure describes a centrifugal pendulum with two different oscillating paths.

BACKGROUND

Centrifugal pendulums are known that have a pendulum flange and a pendulum mass, where the pendulum mass is coupled to the pendulum flange by means of a slotted guide. The pendulum flange may at the same time be connected to additional components of a drive system of a motor vehicle, where a torsional vibration is introduced into the pendulum flange from the components. The torsional vibration excites the pendulum mass to oscillation, where the pendulum mass oscillates phase-shifted from the introduced torsional vibration and at least partially cancels the latter by its phase-shifted oscillation.

SUMMARY

As disclosed herein, it has been recognized that an improved centrifugal pendulum for a drivetrain of a motor vehicle can be provided by the centrifugal pendulum being mountable rotatably around an axis of rotation and having a pendulum flange, a first pendulum mass and a second pendulum mass. The first pendulum mass is coupled with the pendulum flange by means of a slotted guide. The slotted guide is designed to guide the first pendulum mass along a first oscillation path in a first oscillating motion. The second pendulum mass is coupled with the first pendulum mass by a coupling means. The coupling means is designed to guide the second pendulum mass along a second oscillation path in a second oscillating motion.

The above design has an advantage that the centrifugal pendulum has eigenforms, which result from an oscillation behavior of the two pendulum masses relative to each other. As a result, the centrifugal pendulum is suitable for reciprocating engines with cylinder deactivation. By "eigenform" we mean a form in which a centrifugal pendulum damps a predetermined excitation order of a reciprocating engine effectively.

In an example embodiment, the first pendulum mass has a first pendulum mass part, and a second pendulum mass part which is coupled with the first pendulum mass part. The second pendulum mass is positioned axially between the first pendulum mass part and the second pendulum mass part. Alternatively, the second pendulum mass has a third pendulum mass part and a fourth pendulum mass part which is coupled with the third pendulum mass part, the first pendulum mass being positioned axially between the third and the fourth pendulum mass part. This enables the centrifugal pendulum to be designed especially compactly in the axial direction.

In an example embodiment, the first pendulum mass part and the second pendulum mass part are coupled with each other in the axial direction by means of at least one connecting element. The connecting element is guided in the radial direction between the pendulum flange and the second pendulum mass. This enables the centrifugal pendulum to be designed especially compactly in the radial direction.

In an example embodiment, the coupling means has a guide contour on a radially inner circumferential surface of the second pendulum mass or a radially outer circumferential surface of the pendulum flange, the connecting element being part of the coupling means and being designed to at least partially fix the second oscillation path of the second pendulum mass through a touching contact with the guide contour. This makes it possible to provide especially simple guidance of the second pendulum mass.

In an example embodiment, the pendulum flange has a radially inner section essentially in the form of a circular arc, and at least one second section. The second section extends radially outward from the first section, there being in the first section a means for introducing a rotary motion into the pendulum flange, while a first cutout of the slotted guide is provided in the second section and a second cutout of the slotted guide is provided in the first pendulum mass. This enables the first pendulum mass to be coupled with the pendulum flange in a simple manner, in order to guide the first pendulum mass along the first oscillation path in a first oscillating motion.

In an example embodiment, the coupling means has a third cutout in the first pendulum mass, while the second pendulum mass has a fourth cutout. The coupling means includes a coupling element that extends in the axial direction through the third and fourth cutouts. This enables the second pendulum mass to be coupled with the first pendulum mass in a simple manner.

It is advantageous if the second pendulum mass is positioned radially on the outer side of the pendulum flange and surrounds the pendulum flange circumferentially.

For drive systems having a reciprocating engine with cylinder deactivation, it is advantageous if first pendulum masses are coordinated with the second pendulum mass in such a way that the centrifugal pendulum has a first eigenform, and a second eigenform which differs from the first eigenform. This makes it possible for the centrifugal pendulum to be tuned with the first eigenform to a first main excitation order of the reciprocating engine in regular operation without cylinder deactivation, and with the second eigenform to a second main excitation order of the reciprocating engine in operation with cylinders deactivated. The centrifugal pendulum can thereby cancel out torsional vibrations of the reciprocating engine effectively, both with and without cylinder deactivation.

In an example embodiment, the pendulum mass has a third section and a fourth section. The third section is ring-shaped, while the fourth section extends radially inward from the third section. The fourth cutout is positioned in the fourth section. This design is advantageous in order to provide a compact centrifugal pendulum. Furthermore, the centrifugal pendulum has a greater (inertial) mass compared to known centrifugal pendulums, while requiring the same construction space, so that the centrifugal pendulum exhibits improved damping behavior overall.

In an example embodiment, to increase a mass of the second pendulum mass or a mass inertia of the second pendulum mass in a simple way, a protrusion that extends radially inward is provided on the third section; the protrusion being positioned at least partially opposite the second section of the pendulum flange in the circumferential direction.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a perspective view of an example centrifugal pendulum;

FIG. 2 is a front view of the centrifugal pendulum shown in FIG. 1;

FIG. 3 is a partial cross-sectional view through the centrifugal pendulum shown in FIGS. 1 and 2 along sectional plane A shown in FIG. 2;

FIG. 4 is a partial cross-sectional view through the centrifugal pendulum shown in FIGS. 1 and 2 along sectional plane B shown in FIG. 2;

FIG. 5 is a partial cross-sectional view through the centrifugal pendulum shown in FIGS. 1 and 2 along sectional plane C shown in FIG. 2;

FIG. 6 is a partial cross-sectional view through the centrifugal pendulum shown in FIGS. 1 and 2 along sectional plane D shown in FIG. 2;

FIG. 11 is a perspective view of an example centrifugal pendulum with an outer pendulum mass part removed;

FIG. 12 is a front view of the centrifugal pendulum shown in FIG. 11;

FIG. 13 is a partial cross-sectional view through the centrifugal pendulum shown in FIGS. 11 and 12 along sectional plane E shown in FIG. 12;

FIG. 14 is a partial cross-sectional view through the centrifugal pendulum shown in FIGS. 11 and 12 along sectional plane F shown in FIG. 12;

DETAILED DESCRIPTION

Figure 7:
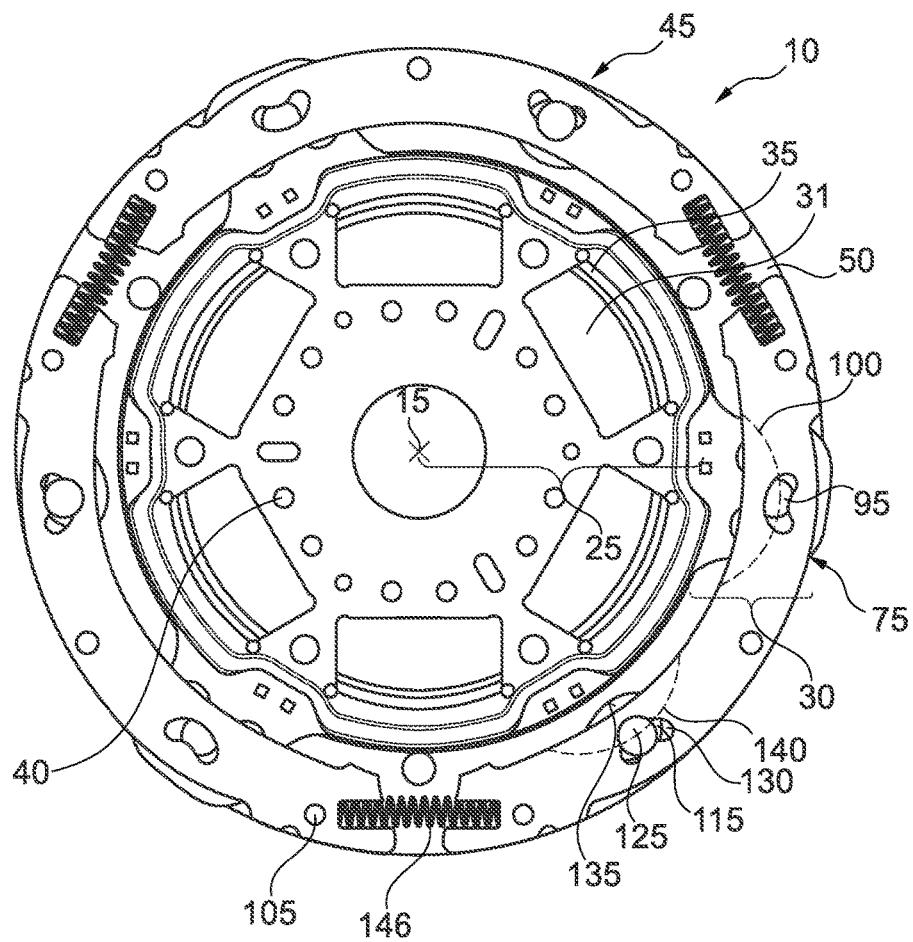
FIG. 7 is a front view of the centrifugal pendulum shown in FIG. 1 with an outer pendulum mass part removed.
Figures 8, 9:
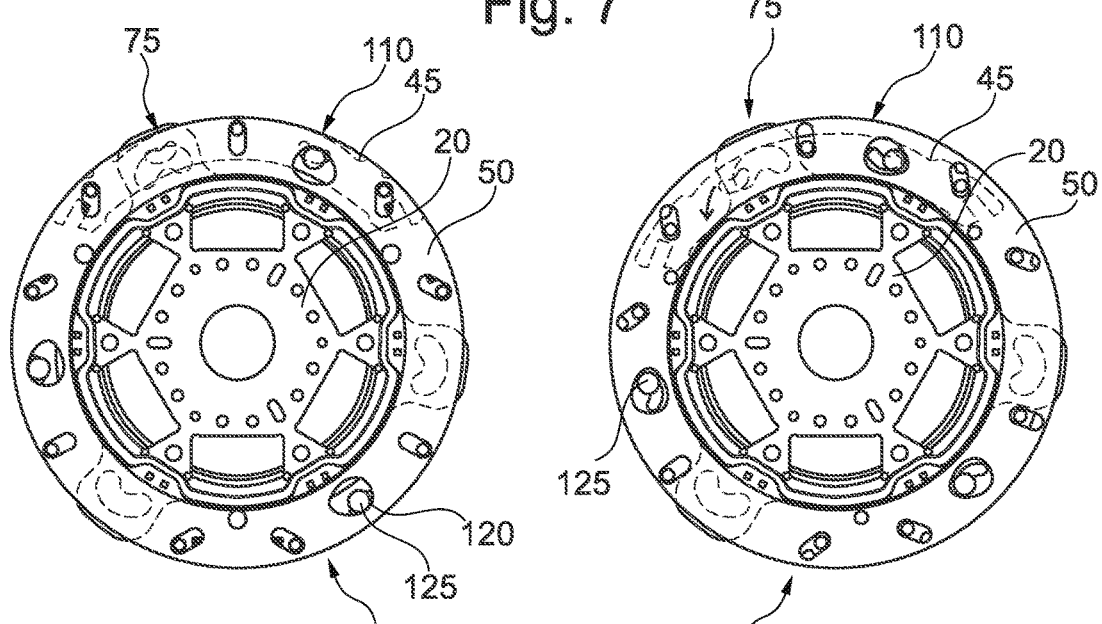
FIG. 8 is a front view of the centrifugal pendulum shown in FIG. 1 in a first operating state.
FIG. 9 is a front of the centrifugal pendulum shown in FIG. 1 in a second operating state.
Figure 10:
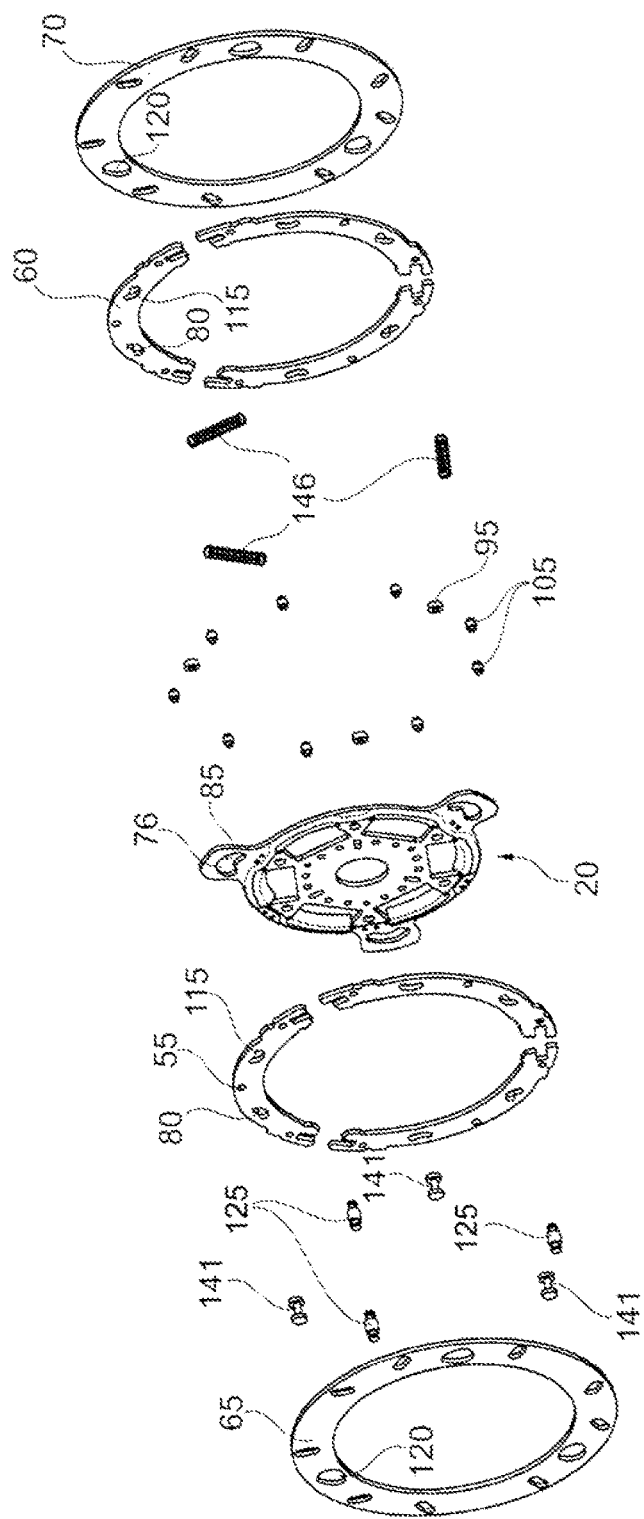
FIG. 10 is an exploded view of the centrifugal pendulum shown in FIGS. 1 through 9.

FIG. 1 shows a perspective view of example centrifugal pendulum 10. FIG. 2 shows a front view of centrifugal pendulum 10 shown in FIG. 1, FIG. 3 shows a partial cross-sectional view through centrifugal pendulum 10 shown in FIGS. 1 and 2 along sectional plane A shown in FIG. 2. FIG. 4 shows a partial cross-sectional view through centrifugal pendulum 10 shown in FIGS. 1 and 2 along sectional plane B shown in FIG. 2. FIG. 5 shows a partial cross-sectional view through centrifugal pendulum 10 shown in FIGS. 1 and 2 along sectional plane C shown in FIG. 2. FIG. 6 shows a partial cross-sectional view through centrifugal pendulum 10 shown in FIGS. 1 and 2 along sectional plane D shown in FIG. 2. FIG. 7 shows a front view of centrifugal pendulum 10 shown in FIG. 1, where parts of centrifugal pendulum 10 shown in FIG. 1 have been removed in order to achieve a better depiction of the centrifugal pendulum 10. FIGS. 8 and 9 show front view of the centrifugal pendulum 10 shown in FIG. 1 in a first operating state and in a second operating state, respectively. FIG. 10 shows an exploded view of centrifugal pendulum 10 shown in FIGS. 1 through 9.

Centrifugal pendulum 10 is mounted so that it can rotate around axis of rotation 15. As depicted in FIGS. 1 through 10, centrifugal pendulum 10 has pendulum flange 20, which can be coupled with the components of a drivetrain (not shown). Pendulum flange 20 has radial section 25 and section 30 (see FIG. 7), Section 30 is positioned radially outside, bordering on section 25, and extends radially outward.

Section 25 is essentially in the form of a circular arc and has openings 31 radially on the inside. Openings 31 serve to receive spring elements (not shown) of a spring damper attached to centrifugal pendulum 10. Openings 31 in this example embodiment are essentially in a straight line, and have strap elements 35 radially on the outside to fix compression springs positioned in opening 31. It is of course also possible to dispense with openings 31, or for openings 31 to be arciform and to extend approximately tangentially in the circumferential direction. Arciform openings 31 serve, for example, to receive a bow spring of the spring damper. Furthermore, section 25 has openings 40 that are positioned radially to the inside of openings 31, which serve to receive screws or rivets in order to connect pendulum flange 20 torsionally to other components of the drivetrain, for example by means of a disk carrier of a friction clutch.

Centrifugal pendulum 10 (see FIGS. 3 through 6) also includes pendulum mass 45 and pendulum mass 50. Pendulum mass 45 has pendulum mass part 55 positioned on the left side of pendulum flange 20 and pendulum mass part 60 positioned on the right side of pendulum flange 20. Pendulum mass 50 has pendulum mass part 65 positioned on the left side of pendulum mass part 55 in FIGS. 3 through 6 and pendulum mass part 70 positioned on the right side of pendulum mass part 60. Pendulum mass part 55 and pendulum mass part 60 are in the form of a partial ring. Pendulum mass 50 and pendulum mass parts 65, 70 are ring-shaped (see FIGS. 2 and 7). In this example embodiment, pendulum mass 45 is positioned between pendulum mass parts 65, 70 in the axial direction.

Pendulum mass 45 is coupled with pendulum flange 20 by means of a slotted guide 75 (see FIG. 7). Slotted guide 75 is designed to guide pendulum mass 45 along oscillation path 100 in an oscillating motion. To this end, slotted guide 75 has cutout 76 positioned in section 30 (see FIG. 10). Furthermore, slotted guide 75 has cutouts 80 positioned in each of pendulum mass parts 55, 60, Cutout 76 is kidney-shaped in this example, and has cutout contour 85. Cutout 80 is likewise kidney-shaped in this example, and has contour 90. Cutout contour 90 extends in the opposite direction to cutout contour 85, which has an outward-directed curvature. Slotted guide 75 also has roller element 95, which extends through cutout 76 and cutouts 80.

If centrifugal pendulum 10 rotates, pendulum masses 45, 50 are pulled radially outward, so that roller element 95 is in contact with radially outer cutout contour 85 of cutout 76 and with radially inner cutout contour 90 of cutout 80. Cutout contour 85 and cutout contour 90 together with roller element 95 determine oscillation path 100, along which pendulum mass 45 oscillates when torsional vibrations are introduced into pendulum flange 20.

In order to connect pendulum mass part 55 axially to pendulum mass part 60, connecting elements 105 are also provided, which are designed in the form of bolts and extend in the axial direction.

Pendulum mass 50 is connected to pendulum mass 45 by coupling means 110. Coupling means 110 has, in pendulum mass 45 and pendulum mass part 55 and/or pendulum mass part 60, cutout 115, and in pendulum mass 50, cutout 120. Cutout 115 is essentially kidney-shaped and curved outward. Cutout 120, on the other hand, is not kidney-shaped but ellipse-like. It is of course also possible for cutout 120 also to be kidney-shaped and cutout 115 instead to be ellipse-like. Roller-type coupling element 125 of coupling means 110 extends in the axial direction through cutout 115 and cutout 120. Cutout 115 has cutout contour 130 and cutout 120 has cutout contour 135. A rolling of coupling element 125 on cutout contour 130 and cutout contour 135 brings about a coupling of pendulum mass 45 with pendulum mass 50.

In order to fix pendulum mass part 65 axially with pendulum mass part 70 (see FIG. 6), connecting elements 141 are provided which extend in the axial direction and are positioned essentially parallel to axis of rotation 15. Connecting elements 141 are positioned in the circumferential direction between pendulum masses 45 and essentially radially inside between pendulum mass 45 and pendulum flange 20. Connecting elements 141 have guide section 155 between pendulum mass parts 65, 70, which is designed to enter into touching contact with outer circumferential surface 160 of section 25 of pendulum flange 20, and therefore define oscillation path 140.

Oscillation path 140 is different in this example from oscillation path 100, and has a center point which is located on axis of rotation 15. It is of course also possible for oscillation paths 100, 140 to be designed differently.

In the first operating state (see FIG. 8), pendulum mass 45 is in a rest position, and FIG. 9 shows a front view of centrifugal pendulum 10 shown in FIGS. 1 through 7 in a second operating state. To make the depiction clearer, only one pendulum mass 45 is shown, using hidden lines. In the first operating state, centrifugal pendulum 10 is in a rest state and is not oscillating. In the rest position, pendulum mass 45 is at a greatest distance from axis of rotation 15. If a torsional vibration is introduced into pendulum flange 20, pendulum flange 20 rotates relative to pendulum mass 45. Because of the path shape of oscillation path 100, oscillation path 100 is pulled radially inward in this example and is accelerated in the circumferential direction, for which reason pendulum mass 45 is moved radially inward into a second operating state with respect to the first operating state, and in the circumferential direction. Because of the form of coupling means 110, the offset in the circumferential direction is transferred to pendulum mass 50, but the movement of pendulum mass 45 in the radial direction is not transferred to pendulum mass 50. Therefore, pendulum mass 50 oscillates likewise with pendulum mass 45 and cancels the torsional vibration. Because of the form of coupling means 110, in the oscillating motion pendulum mass 50 may oscillate synchronously with pendulum mass 45, or may oscillate counter to pendulum mass 45.

In summary, to cancel the torsional vibration, two effects are used to produce a restoring torque to return pendulum masses 45, 50 to the rest position. On the one hand, as with known centrifugal pendulums, a potential energy in the centrifugal force field is utilized to guide pendulum mass 45 from its deflected position (see FIG. 9) back into the rest position. In the rest position, pendulum mass 45 is radially at the outermost and thus in its most stable position. Furthermore, the inertial energy of pendulum mass 50 is used to bring pendulum mass 45 back into the rest position again.

Because of differently designed pendulum masses 45, 50 and/or differently designed oscillation paths 100, 140, centrifugal pendulum 10 may have a first eigenform and a second eigenform. The second eigenform differs, for example, from the first eigenform. It is also possible for the second eigenform to be the same as the first eigenform.

If centrifugal pendulum 10 is coupled with a reciprocating engine that has cylinder deactivation, centrifugal pendulum 10 is operated in response to two completely different operating states of the reciprocating engine. In regular operation of the reciprocating engine, all cylinders are active and the reciprocating engine has a first main excitation order. If cylinders of the reciprocating engine are deactivated selectively by means of cylinder deactivation, the reciprocating engine has a second main excitation order which is different from the first main excitation order. It is advantageous if the first eigenform is coordinated with the first main excitation order of the reciprocating engine and the second eigenform is tuned to the second main excitation order of the reciprocating engine. The eigenform is understood here to mean a form in which centrifugal pendulum 10 damps a predetermined excitation order of a reciprocating engine especially effectively.

The first and second eigenforms make it possible to adjust centrifugal pendulum 10 in a simple manner to the reciprocating engine that has cylinder deactivation. In this way, a particular driving behavior of the motor vehicle having a reciprocating engine with cylinder deactivation and centrifugal pendulum shown in FIGS. 1 through 10 can be improved with the effect that in both operating states of the reciprocating engine, with cylinder deactivation and without cylinder deactivation, centrifugal pendulum 10 is able to damp torsional vibrations effectively, and thus an especially quiet drivetrain is provided.

Depending on the design of pendulum masses 45, 50, pendulum masses 45, 50 may oscillate counter to each other when torsional vibrations are introduced into centrifugal pendulum 10, or synchronously, i.e., in the same direction along oscillation paths 100 and 140. In an example embodiment, the coordination of pendulum mass 45 with pendulum mass 50 in both mass and oscillation path is chosen so that the first eigenform of centrifugal pendulum 10 is twice the size or half the size of the second eigenform. This would be particularly advantageous for reciprocating engines with cylinder deactivation in which the number of cylinders is cut in half.

In an example embodiment, to prevent pendulum masses 45 from colliding with each other in the circumferential direction, spring element 146 is provided between pendulum masses 45, 50. Spring element 146 is aligned essentially tangentially to axis of rotation 15. It is of course also possible fur other bumpers to be provided on the longitudinal ends in the circumferential direction oft pendulum masses 45. It is also possible for the spring element 146 or bumpers on pendulum masses 45 to be dispensed with.

Figure 15:
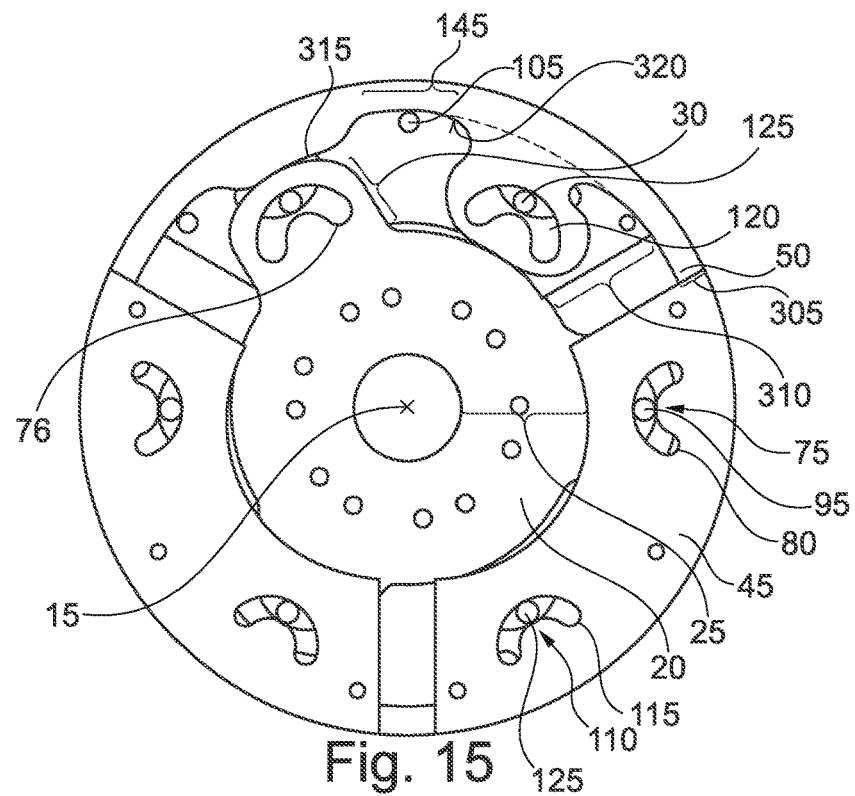
FIG. 15 is a front view of the centrifugal pendulum shown in FIG. 11 in a first operating state.
Figure 16:
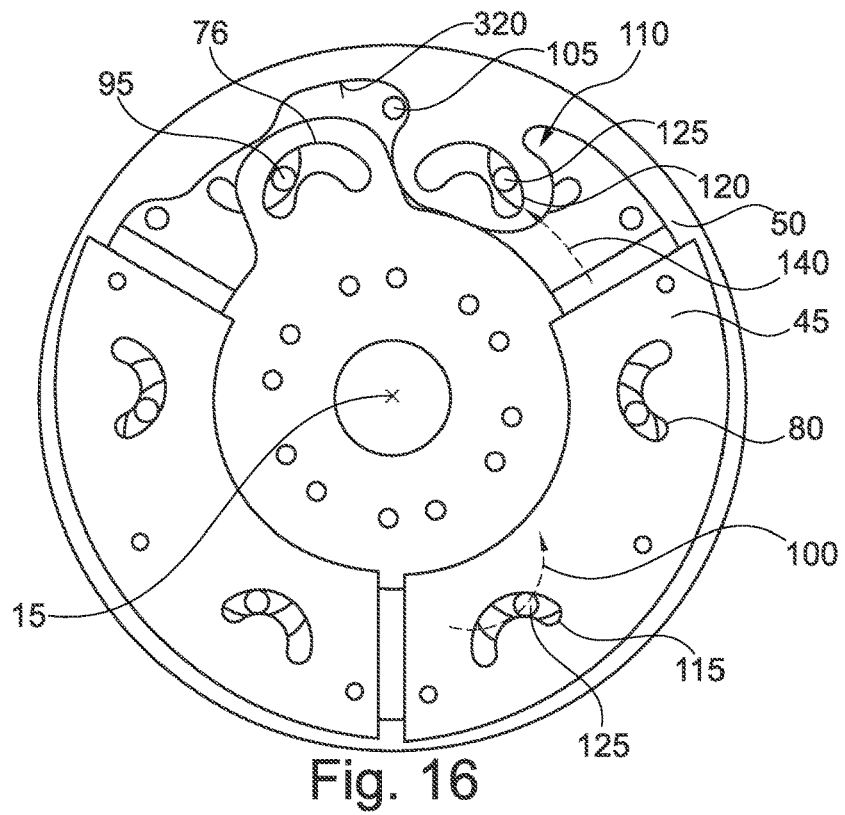
FIG. 16 is a front view of the centrifugal pendulum shown in FIG. 11 in a second operating state.

FIG. 11 shows a perspective view of example centrifugal pendulum 300. FIG. 12 shows a front view of centrifugal pendulum 300 shown in FIG. 11. FIG. 13 shows a partial cross-sectional view through centrifugal pendulum 300 shown in FIGS. 11 and 12 along sectional plane E shown in FIG. 12. FIG. 14 shows a partial cross-sectional view through centrifugal pendulum 300 shown in FIGS. 11 and 12 along sectional plane F shown in FIG. 12. FIG. 15 shows a front view of centrifugal pendulum 300 shown in FIG. 11 in a first operating state. FIG. 16 shows a front view of centrifugal pendulum 300 shown in FIG. 11 in a second operating state. FIGS. 11 through 16 will be explained together below. To improve the depiction, in FIG. 11 a pendulum mass part 55 on pendulum mass 45 is not shown. Unless noted otherwise, the respective descriptions for reference characters shown in FIGS. 1 through 10 are applicable to reference characters shown in FIGS. 11 through 16.

Centrifugal pendulum 300 is similar in design to centrifugal pendulum 10 shown in FIGS. 1 through 10. Deviating therefrom, pendulum mass 50 is made in a single piece and of uniform material, and is positioned between pendulum mass part 55 and pendulum mass part 60 of pendulum mass 45 in the axial direction. Pendulum mass 50 is positioned radially on the outer side of pendulum flange 20. Pendulum mass 50 is likewise ring-shaped, and completely surrounds pendulum flange 20 circumferentially. Because of the single-piece design of pendulum mass 50, it is possible to dispense with connecting elements 141 for coupling pendulum mass parts 65, 70 shown in FIGS. 1 through 10. This makes centrifugal pendulum 300 shown in FIGS. 11 through 16 especially cost-effective to produce.

Pendulum mass 50 has section 305, which is ring-shaped and completely surrounds pendulum flange 20 circumferentially. Section 310 extends radially inward, starting from section 305. Cutout 120 is positioned in section 310. By providing radially inward-extending section 310, enough construction space is created in the circumferential direction to position pendulum flange 50 completely axially between pendulum mass part 55 and pendulum mass part 60.

On ring-shaped third section 305 protrusion 315 is provided, projecting radially inward. Protrusion 315 extends radially in the direction of t section 30 of pendulum flange 20. In a rest position (see FIG. 15) of pendulum mass 45, protrusion 315 and section 305 are opposite each other in the radial direction and the circumferential direction. Protrusion 315 makes it possible to increase the mass of pendulum mass 50, and thus a mass inertia of pendulum mass 50, in a simple manner.

In the circumferential direction between section 310 and protrusion 315, section 305 has guide contour 145 on circumferential surface 320 located radially on the inner side of pendulum mass 50. Guide contour 145 is in contact with guide section 155 of connecting element 105. This enables pendulum mass 50 to be guided effectively by pendulum mass 45 in oscillation paths 100, 140. Furthermore, in an example embodiment, because of the positioning of connecting element 105 radially between pendulum flange 20 and pendulum mass 50, pendulum mass 50 is designed with especially high mass.

In addition, in an example embodiment, spring elements (not shown) are positioned between pendulum masses 45, 50, or from pendulum mass 45 to pendulum flange 20, or between pendulum flange 20 and pendulum mass 50. In this example, the spring elements (not shown) serve as additional energy storage elements in centrifugal pendulum 10, 300, and thus improve the damping behavior of centrifugal pendulum 10, 300.

The designs of centrifugal pendulum 10, 300 described above also have the advantage that a Hertzian pressure in coupling means 110 or in slotted guide 75 is reduced, since pendulum masses 45, 50 as a whole have a smaller mass. Furthermore, centrifugal pendulum 10, 300 has improved damping behavior compared to known centrifugal pendulums, in particular at low speeds of rotation, through use of the inertias of pendulum masses 45, 50 and spring elements 146.

It should be understood that the features of the example embodiments shown in FIGS. 1 through 10 and 11 through 16 can be combined with each other.

it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A centrifugal pendulum, comprising:
   a pendulum flange including a first cutout;
   an axis of rotation for the pendulum flange;
   a first pendulum mass arranged to oscillate with respect to the pendulum flange and including first and second cutouts;
   a second pendulum mass arranged to oscillate with respect to the pendulum flange and including a first cutout;
   a first roller element:
      disposed within the first cutout of the pendulum flange;
      disposed within the first cutout for the first pendulum mass; and,
      rollable within the first cutout of the pendulum flange and the first cutout for the first pendulum mass;
   a first roller-type coupling element:
      disposed in the second cutout for the first pendulum mass;
      disposed in the first cutout for the second pendulum mass; and,
      rollable within the second cutout for the first pendulum mass, wherein:
   the first roller-type coupling element does not pass through the pendulum flange; and,
   the second pendulum mass is in the shape of a continuous ring.

2. The centrifugal pendulum of claim 1, further comprising:
   a third pendulum mass displaceable with respect to the pendulum flange and including first and second cutouts; and,
   a fourth pendulum mass displaceable with respect to the pendulum flange and including a first cutout, wherein:
   the first roller element is:
      disposed within the first cutout for the third pendulum mass; and,
      rollable within the first cutout for the third pendulum mass; and,
   the first roller-type coupling element is:
      disposed in the second cutout for the third pendulum mass;
      disposed in the first cutout for the fourth pendulum mass; and,
      rollable within the second cutout for the third pendulum mass.

3. The centrifugal pendulum of claim 2, further comprising:
   at least one first coupling element connecting the first and third pendulum masses; and,
   at least one second coupling element connecting the second and fourth pendulum masses, wherein the at least one first and second coupling elements do not pass through the pendulum flange.

4. The centrifugal pendulum of claim 2, wherein:
the first and third pendulum masses are axially disposed between the second and fourth pendulum masses; or,
the first and third pendulum masses and the pendulum flange are axially disposed between the second and fourth pendulum masses.

5. The centrifugal pendulum of claim 2, further comprising:
a fifth pendulum mass displaceable with respect to the pendulum flange and including a first cutout;
a sixth pendulum mass displaceable with respect to the pendulum flange and including a first cutout; and,
a second roller element, wherein:
the pendulum flange includes a second cutout; and,
the second roller element is:
disposed within the second cutout of the pendulum flange;
disposed within the first cutout for the fifth pendulum mass;
disposed within the first cutout for the sixth pendulum mass; and,
rollable within the second cutout of the pendulum flange, the first cutout for the fifth pendulum mass, and the first cutout for the sixth pendulum mass.

6. The centrifugal pendulum of claim 5, further comprising:
a second roller-type coupling element, wherein:
the second pendulum mass includes a second cutout;
the fourth pendulum mass includes a second cutout;
the fifth pendulum mass includes a second cutout;
the sixth pendulum mass includes a second cutout;
the second roller-type coupling element is:
disposed within the second cutout for the second pendulum mass;
disposed within the second cutout for the fourth pendulum mass;
disposed within the second cutout for the fifth pendulum mass;
disposed within the second cutout for the sixth pendulum mass; and,
rollable within the respective second cutouts of the second, fourth, fifth and sixth pendulum masses; and,
the second roller-type coupling element does not pass through the pendulum flange.

7. The centrifugal pendulum of claim 2, wherein:
the pendulum flange includes first and second sides;
the first and fourth pendulum masses are located on the first side of the pendulum flange; and,
the second and third pendulum masses are located on the second side of the pendulum flange.

8. The centrifugal pendulum of claim 1, wherein the first roller-type coupling element is located radially outward of the pendulum flange.

9. The centrifugal pendulum of claim 1, wherein
the first pendulum mass is in the shape of an arc, which does not form a continuous ring.

10. The centrifugal pendulum of claim 1, wherein:
the second pendulum mass is in the shape of a continuous ring, the centrifugal pendulum further comprising:
third and fourth pendulum masses displaceable with respect to the pendulum flange and located axially between the pendulum flange and the second pendulum mass.

11. The centrifugal pendulum of claim 10, wherein:
the pendulum flange includes a second cutout;
the second pendulum mass includes a second cutout;
the third pendulum mass includes a first cutout;
the fourth pendulum mass includes a first cutout, the centrifugal pendulum further comprising:
a second roller element:
disposed within the second cutout of the pendulum flange;
disposed within the first cutout for the third pendulum mass; and,
rollable within the second cutout of the pendulum flange and the first cutout for the third pendulum mass; and,
a second roller-type coupling element:
disposed in the first cutout for the fourth pendulum mass;
disposed in the second cutout for the second pendulum mass; and,
rollable within the second cutout for the second pendulum mass, wherein the second roller-type coupling element does not pass through the pendulum flange.

12. A centrifugal pendulum, comprising:
a pendulum flange including a first cutout;
an axis of rotation for the pendulum flange;
a first pendulum mass displaceable with respect to the pendulum flange and including first and second cutouts;
a second pendulum mass displaceable with respect to the pendulum flange and including first and second cutouts;
a third pendulum mass displaceable with respect to the pendulum flange and including a first cutout;
a first roller element:
disposed within the first cutout of the pendulum flange;
disposed within the first cutout for the first pendulum mass;
disposed within the first cutout for the second pendulum mass; and,
rollable within the first cutout of the pendulum flange, the first cutout for the first pendulum mass, and the first cutout for the second pendulum mass; and,
a first roller-type coupling element:
disposed in the second cutout for the first pendulum mass;
disposed in the second cutout for the second pendulum mass;
disposed in the first cutout for the third pendulum mass; and,
rollable within the second cutout for the first pendulum mass and the first cutout for the third pendulum mass, wherein the first roller-type coupling element does not pass through the pendulum flange.

13. The centrifugal pendulum of claim 12, further comprising:
a fourth pendulum mass displaceable with respect to the pendulum flange and including a first cutout, wherein the first roller-type coupling element is:
disposed in the first cutout for the fourth pendulum mass; and,
rollable within the first cutout for the fourth pendulum mass.

14. The centrifugal pendulum of claim 13, wherein:
the first pendulum mass is disposed, in a direction parallel to the axis of rotation, between the pendulum flange and the third pendulum mass; and,
the second pendulum mass is disposed, in the direction, between the pendulum flange and the fourth pendulum mass.

15. The centrifugal pendulum of claim 13 further comprising:
- a fifth pendulum mass displaceable with respect to the pendulum flange and including a cutout;
- a sixth pendulum mass displaceable with respect to the pendulum flange and including a cutout; and,
- a second roller element, wherein:
  - the pendulum flange includes a second cutout; and,
  - the second roller element is:
    - disposed within the second cutout of the pendulum flange;
    - disposed within the cutout for the fifth pendulum mass;
    - disposed within the cutout for the sixth pendulum mass; and,
    - rollable within the second cutout of the pendulum flange, the cutout for the fifth pendulum mass, and the cutout for the sixth pendulum mass.

\* \* \* \* \*